(12) United States Patent
Lu et al.

(10) Patent No.: US 8,253,983 B2
(45) Date of Patent: Aug. 28, 2012

(54) STAMPING SYSTEM AND METHOD USING A PORTABLE COMMUNICATION DEVICE

(75) Inventors: Xin Lu, Shenzhen (CN); Shih-Fang Wong, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1300 days.

(21) Appl. No.: 11/847,353

(22) Filed: Aug. 30, 2007

(65) Prior Publication Data

US 2008/0055657 A1    Mar. 6, 2008

(30) Foreign Application Priority Data

Sep. 1, 2006    (CN) .......................... 2006 1 0062448

(51) Int. Cl.
*H04N 1/40* (2006.01)
*G08B 1/00* (2006.01)
*G06F 21/00* (2006.01)
*H04L 9/32* (2006.01)
*H02K 7/06* (2006.01)
*H01L 41/04* (2006.01)

(52) U.S. Cl. .................. 358/3.29; 340/539.22; 713/186; 713/176; 318/115; 318/116

(58) Field of Classification Search ........................ None
See application file for complete search history.

(56) References Cited

U.S. PATENT DOCUMENTS

| | | | | |
|---|---|---|---|---|
| 3,263,333 A * | 8/1966 | Bell | ............................. | 33/23.11 |
| 7,936,482 B2 * | 5/2011 | Takezaki et al. | ............. | 358/3.28 |
| 2005/0134926 A1 * | 6/2005 | Takezaki et al. | ............. | 358/3.28 |

* cited by examiner

*Primary Examiner* — Thomas J Lett
*Assistant Examiner* — Marcus T Riley
(74) *Attorney, Agent, or Firm* — Altis Law Group, Inc.

(57) ABSTRACT

A stamping system using a portable communication device is provided. In a preferred form, the stamping system has a server and a portable communication device, the server has a computer program for generating a file code and a log file, the portable communication device has a central processor, a communication unit, and a seal, the seal is used for generating a seal impression, when receiving a file code generation request, the server generates a file code and sends the file code to the portable communication device, the central processor sends a control signal to the seal in response to the file code, the seal generates a seal impression corresponding with the file code, the communication unit sends a log file generation request to the server, and the server generates a log file in response to the log file generation request.

7 Claims, 5 Drawing Sheets

STAMPING SYSTEM AND METHOD USING A PORTABLE COMMUNICATION DEVICE

BACKGROUND OF THE INVENTION

1. Field of the Invention

The present invention relates to a stamping system and method, especially to a stamping system and method utilizing a portable communication device.

2. Description of Related Art

People usually sign their names or affix a seal impression on a paper document to approve the paper document. However, a written signature or a seal on a paper document can be counterfeited.

In order to solve the problem mentioned above, an electronic signature method utilizing a portable communication device is introduced. The signature method uses a computer to store an electronic signature and uses a portable communication device to store a private key. When signing a file, a server sends a request to the portable communication device. If the portable communication device confirms the request, the server obtains files to be signed from the computer and transfers the obtained files to the portable communication device. The portable communication device receives the files and encrypts the files utilizing the private key. The portable communication device sends the encrypted files to the server. The server receives the encrypted files and signs the encrypted files via the electronic signature.

Although the electronic signature method mentioned could avoid the counterfeiting signature problem, some people are still in the habit of approving a paper document manually.

SUMMARY OF THE INVENTION

A stamping system and method using a portable communication device is provided. In a preferred form, the stamping system has a server and a portable communication device, the server has a computer program for generating a file code and a log file, the portable communication device has a central processor, a communication unit, and a seal, the seal is used for generating a seal impression, when receiving a file code generation request, the server generates a file code and sends the file code to the portable communication device, the central processor sends a control signal to the seal in response to the file code, the seal generates a seal impression corresponding with the file code, the communication unit sends a log file generation request to the server, and the server generates a log file in response to the log file generation request.

The method for affixing a seal impression on a paper document using a portable communication device comprises: (a) sending a file code generation request to a server; (b) generating a file code and sending the file code to a portable communication device; (c) sending a control signal to a seal; (d) generating a combination of characters corresponding with the file code; (e) sending a log file generation request to the server; and (f) generating a log file.

Other systems, methods, features, and advantages will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION OF THE INVENTION

Figure 1:
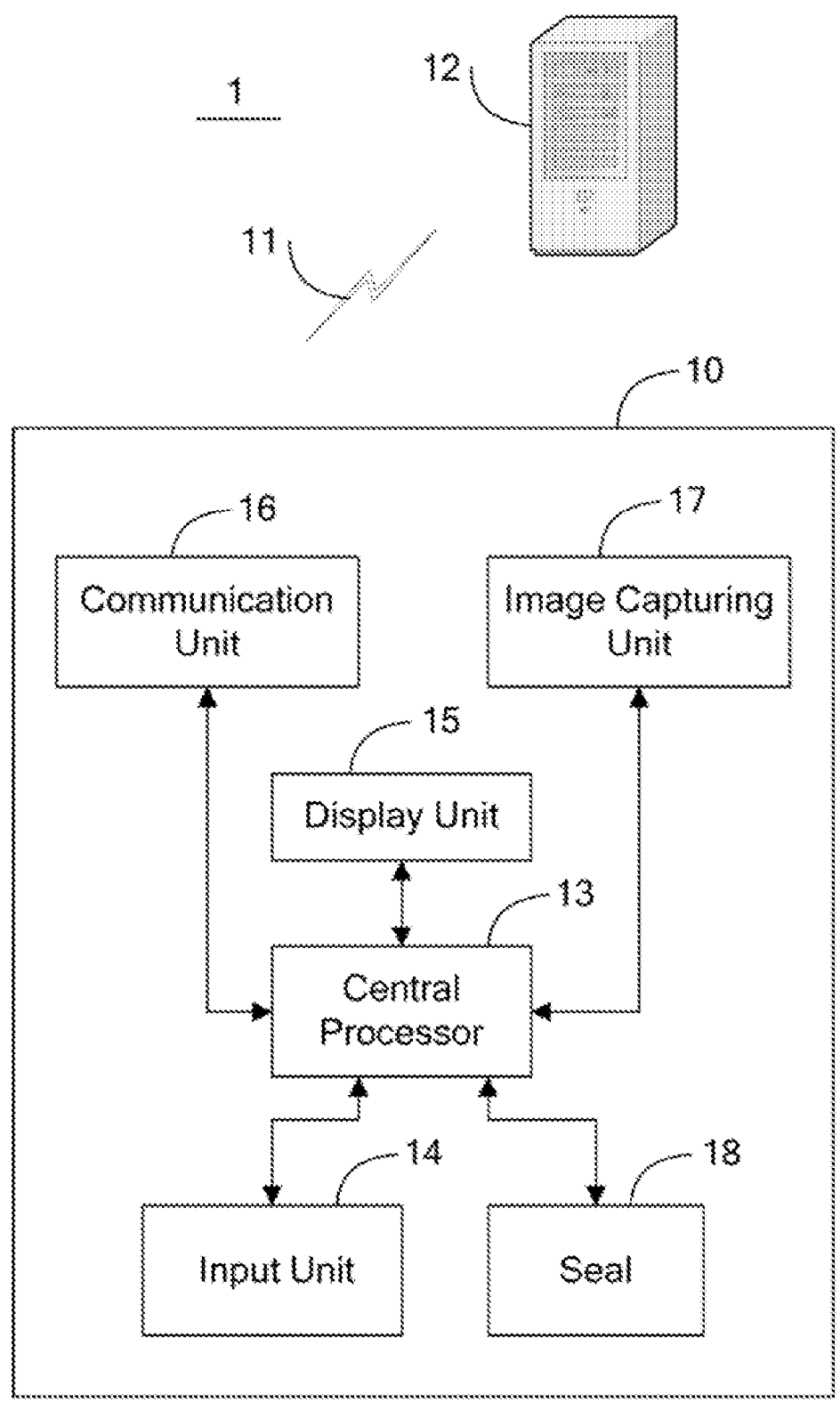
FIG. 1 is a block diagram of a stamping system for affixing a seal impression on a paper document using a portable communicating device in accordance with a preferred embodiment of the present invention.

FIG. 1 is a block diagram of a stamping system for affixing a seal impression on a paper document using a portable communicating device in accordance with a preferred embodiment of the present invention. The stamping system 1 includes a portable communication device 10, a wireless network 11, and a server 12 which stores a user profile. The user profile includes information about the portable communication device 10, such as a user name and a user password. The portable communication device 10 can be connected to the server 12 and communicate with the server 12 through the wireless network 11.

The portable communication device 10 includes a central processor 13, an input unit 14, a display unit 15, a communication unit 16, an image capturing unit 17, and a seal 18.

The input unit 14 is configured for receiving operational inputs to operate the portable communication device 10, such as an input for activating the image capturing unit 18, an input for sending a file code generation request to the server 12, and an input for sending a log file generation request to the server 12.

The communication unit 16 is configured for transferring data between the portable communication device 10 and the server 12 through the wireless network 11.

The image capturing unit 17, such as a built-in camera, is used for capturing a digital image of a paper document.

Figure 2:
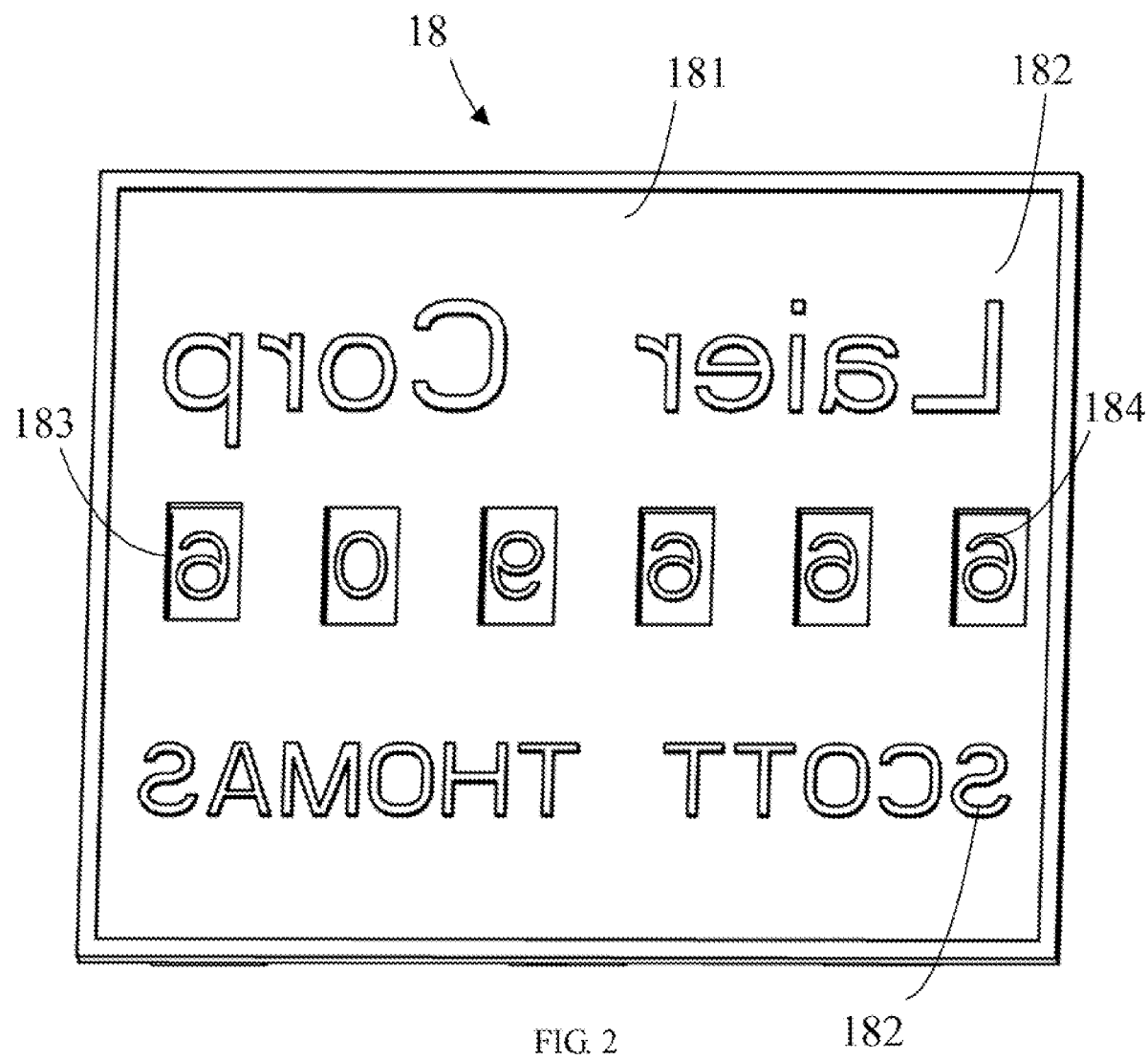
FIG. 2 is a schematic diagram of an engraved surface of the seal of FIG. 1.

Referring to FIG. 2, the seal 18 includes an engraved surface 181. The engraved surface 181 includes engravings 182 protruding out of the engraved surface 181. Typically, the engravings 182 are mirror images of words, symbols, signs, figures, digits, or any combination of them. For example, in the preferred embodiment as shown in FIG. 2, the engravings 182 are the mirror image of "SCOTT THOMAS" and "Laier Corp", representing a user name and a company name. The engraved surface 181 further defines a plurality of openings 183 where a plurality of raised digits 184 are exposed correspondingly. In the preferred embodiment, the plurality of openings 183 are defined linearly above the engravings 182, but in other embodiments, the plurality of openings 183 may be defined in other manners.

Figure 3:
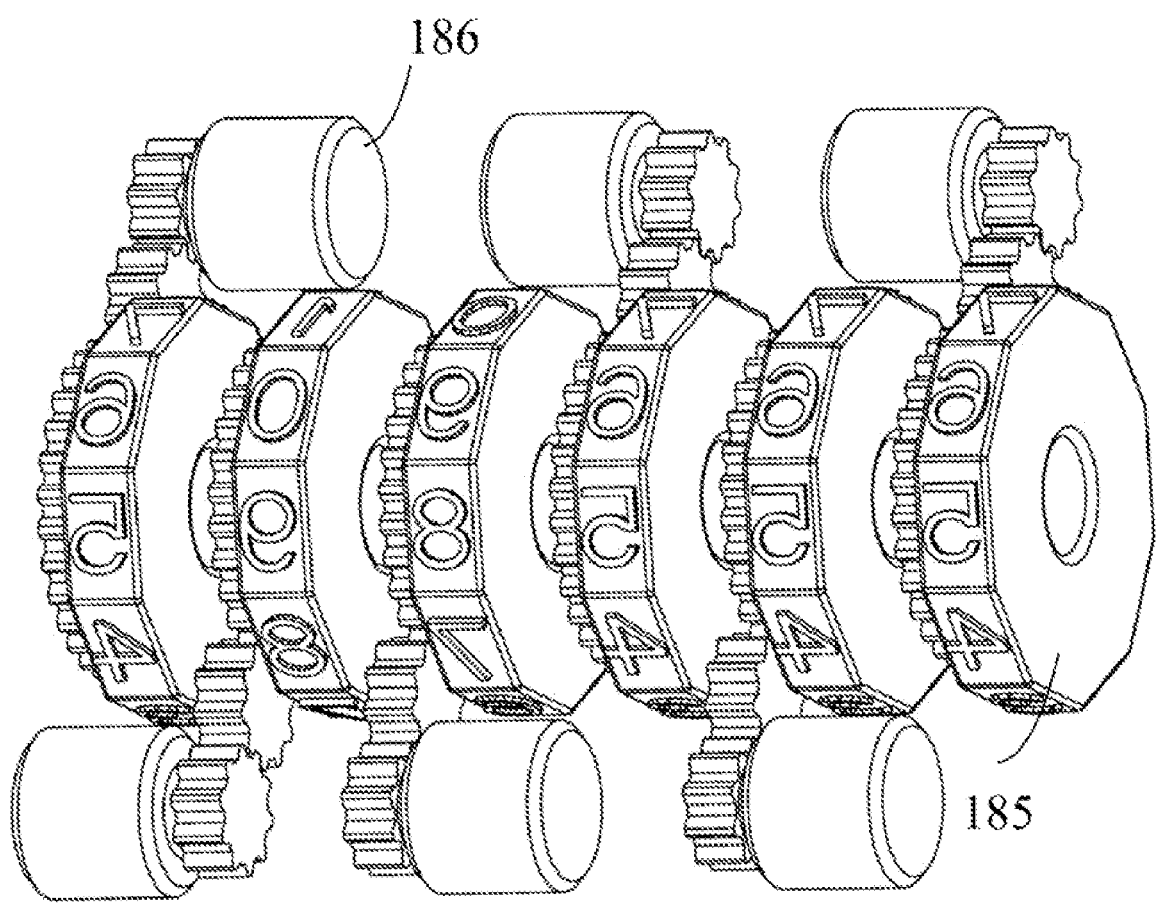
FIG. 3 is a schematic diagram of rotatable discs and motors of the seal of FIG. 1.
Figure 4:
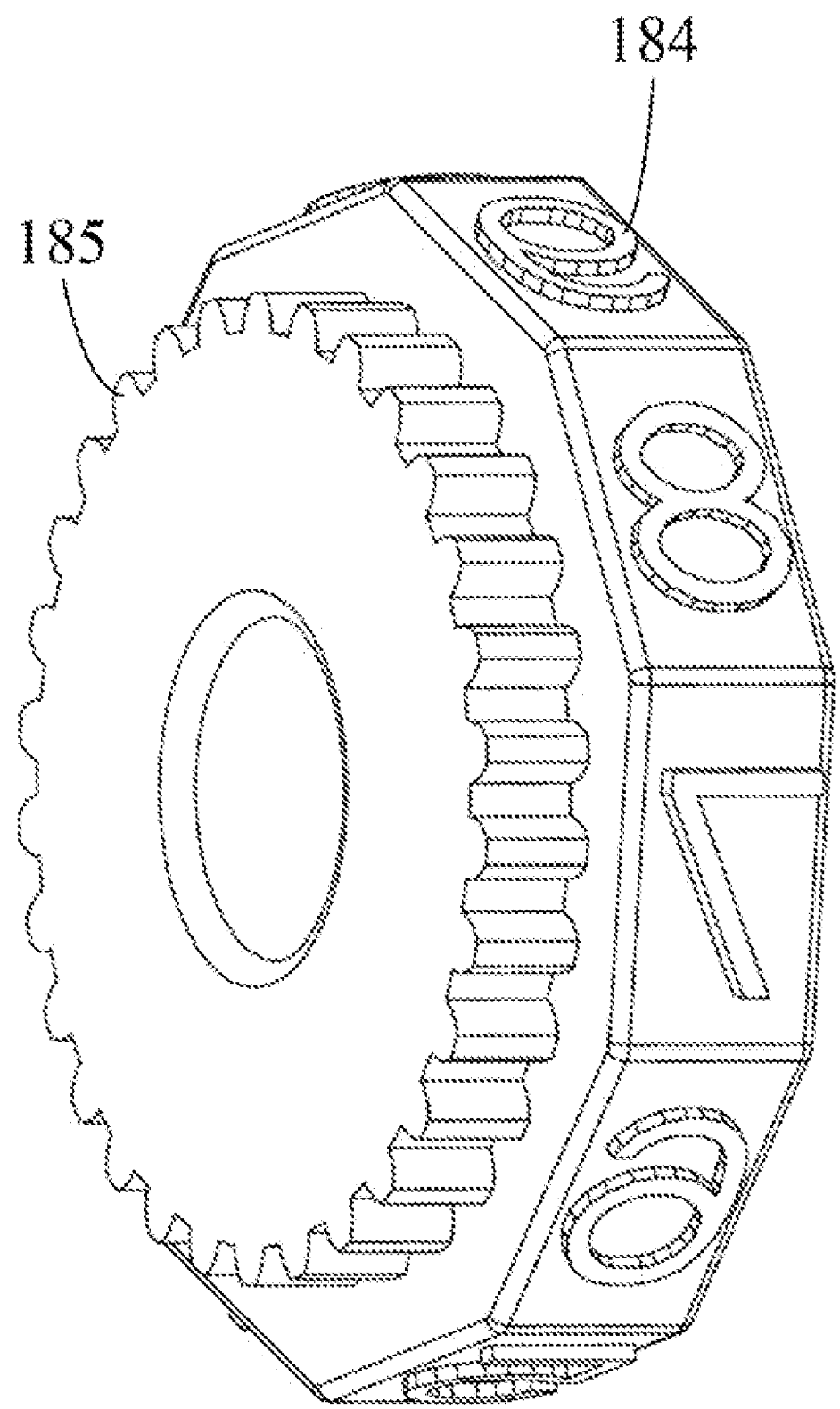
FIG. 4 is a schematic diagram of a rotatable disc of the seal of FIG. 1.

Referring to FIG. 3, the seal 18 further has a plurality of rotatable discs 185 and motors 186 underneath the engraved surface 181 corresponding to the plurality of openings 183. Each of the motors 186 is configured for driving a corresponding disc 185. Each of the discs 185 has a plurality of raised mirrored digits 184 ranging from 0 to 9 on an outer circumferential surface. The rotatable discs 185 and the motors 186 are disposed at a back surface of the seal 18 opposite to the engraved surface 181 in a manner such that the outer circumferential surface of the rotatable discs 185 slightly protrudes out of the openings 183, correspondingly exposing one of the raised digit 184 on the engraved surface 181.

The server 12 stores a computer program for generating a file code and a log file. The file code is a unique code and is generated randomly after the server 12 receives the file code generation request. The file code can be a combination of digits, a combination of alphabets, a combination of alphanumeric characters, or a combination of characters. The file code is stored in a specific folder on the server 12.

Each of the plurality of rotatable discs 185 is rotatable to a predetermined position, allowing a combination of the digits 184 of the plurality of rotatable discs 185 to correspond to the file code generated by the server 12. Specifically, after receiving the file code, the central processor 13 generates a control signal according to the file code and sends the control signal to the seal 18. The motors 186 then correspondingly drive the rotatable discs 185, rotating the discs 185 to expose corresponding raised mirrored digits 184 through the openings 183 according to the control signal, thus, a combination of raised mirrored digits 184 corresponding to the file code protrudes out of the openings 183. As a result, a seal impression, including the engravings 182 and the combination of raised mirrored digits 184 according to the file code, is obtained on the engraved surface 181, thereby yielding a generated seal impression.

After the generated seal impression is obtained, the engraved surface 181 of the seal 18 is pressed on an inkpad and then pressed on the paper document, thus affixing a print of the generated impression on the paper document.

After the seal impression is affixed on the paper document, the digital image of the paper document can be captured and sent to the server 12 via the portable communication device 10. The digital image is then stored in the specific folder containing the file code.

After the digital image is sent to the server 12, the log file generation request can be sent to the server 12. After receiving the log file code generation request, the server 12 generates the log file.

The log file includes the user name in the user profile, the date of receiving the log file generation request, and the file code and the digital image stored in the specific folder. The user name is the name of a person who approves the paper document. The date of receiving the log file generation request is the date of approving the paper document.

The file code is unique and so the seal impression includes the combination of digits is unique. If a seal impression on a paper document does not correspond with the seal impression in the digital image of a corresponding log file, the seal impression on the paper document is counterfeited. So when verifying a seal impression on a paper document, accessing the server 12 and comparing the seal impression on the paper document with the digital image of the corresponding log file stored on the server 12.

Figure 5:
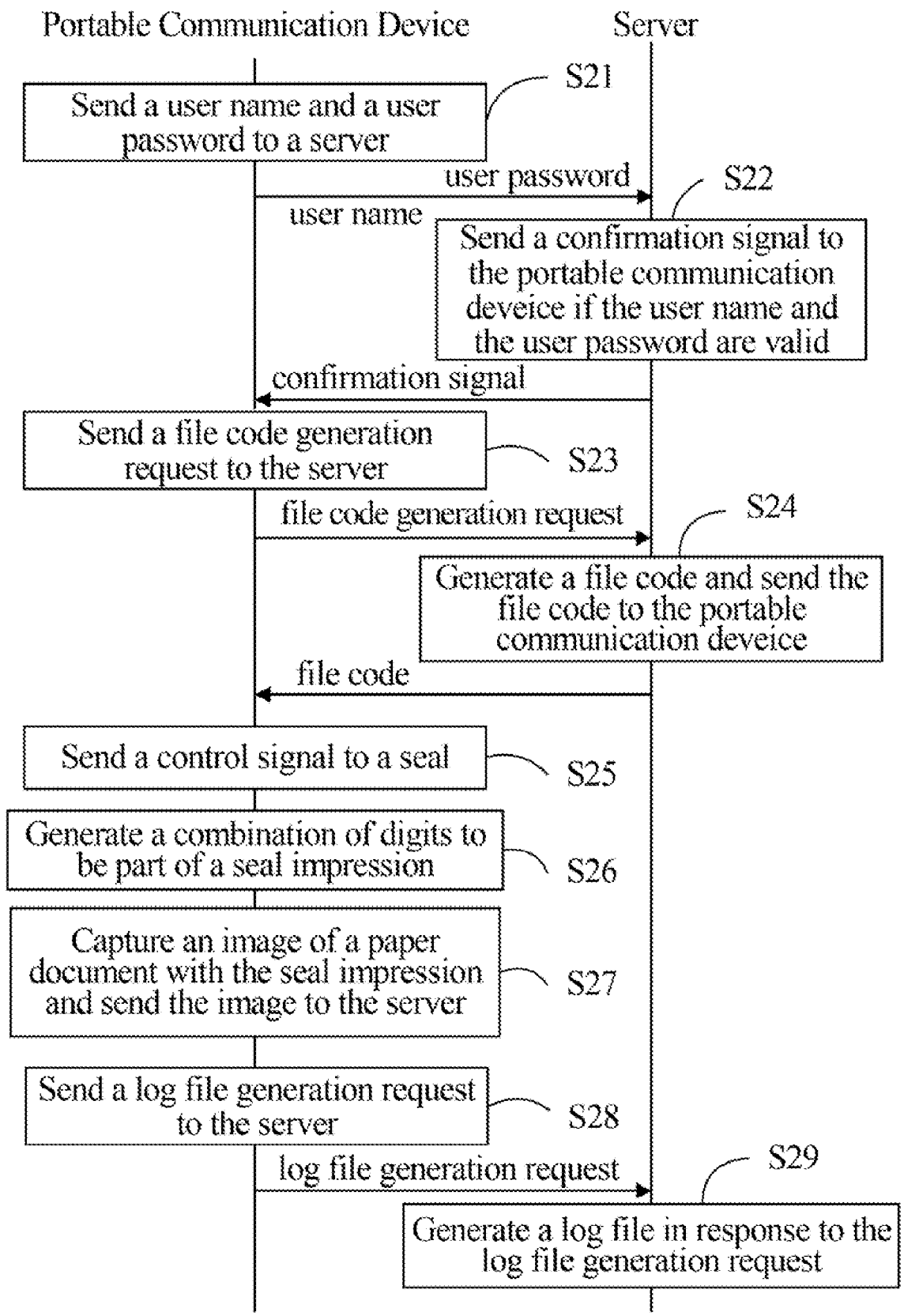
FIG. 5 is a flowchart of a preferred method for affixing a seal impression on a paper document by using the portable communication device 10 of FIG. 1.

FIG. 5 is a flowchart of a preferred method for affixing a seal impression on a paper document by using the portable communication device 10 of FIG. 1. In step S21, the communication unit 17 sends the user name and the user password to the server 11.

In step S22, the server 11 verifies the user name and the user password according to the user profile. If the user name and the user password are valid, the server 11 sends a confirmation signal to the portable communication device 10.

In step S23, the communication unit 17 sends the file code generation request to the server 12. In step S24, the server 11 generates the file code in response to the file code generation request and sends the file code to the portable communication device 10.

In step S25, the central processor 13 sends the control signal to the seal 18. In step S26, the seal 18 generates the combination of digits 184 which corresponds to the file code. As a result, the combination of digits 184 accompanying with the engravings 182 forms the seal impression.

In step S27, the image capturing unit 14 is activated to capture an image of the paper document with the seal impression. In step S28, the communication unit 16 sends the log file generation request to the server 11. In step S29, the server 11 generates the log file in response to the log file generation request.

Although the present invention has been specifically described on the basis of a preferred embodiment including preferred methods thereof, the invention is not to be construed as being limited thereto. Various changes or modifications may be made to the embodiment including the methods without departing from the scope and spirit of the invention.

What is claimed is:

1. A stamping system for affixing a seal impression on a paper document, comprising:
    a wireless network;
    a server having a computer program for generating randomly a unique file code and a log file, wherein said file code is configured for identifying said paper document, and said log file is configured for recording information about generating said seal impression; and
    a portable communication device comprising:
        a central processor;
        an input unit;
        a communication unit for communicating with said server through said wireless network; and
        a seal for generating said seal impression to be affixed on said paper document, the seal comprising a plurality of rotatable discs, each of the plurality of rotatable discs comprising engraved characters on an outer surface thereof, each of the plurality of rotatable discs being rotatable to a predetermined position, allowing a combination of the engraved characters of the plurality of rotatable discs to correspond to the file code generated by the server;
    wherein, when receiving a file code generation request, said server generates said file code randomly and sends said file code to said portable communication device, said central processor sends a control signal to said seal after receiving said file code, said seal generates said seal impression that comprises the combination of the engraved characters of the plurality of rotatable discs that corresponding to said file code generated by said server, said communication unit sends a log file generation request to said server, and said server generates said log file in response to said log file generation request.

2. The stamping system according to claim 1 further comprises an image capturing unit for capturing an image of said paper document.

3. The stamping system according to claim 1, wherein said seal comprises an engraved surface, and a plurality of motors, said engraved surface defines a plurality of openings to expose said engraved characters to expose, each of said motors drives a corresponding rotatable discs to rotate to obtain the combination of said characters protruding out of said openings in response to said control signal.

4. The stamping system according to claim 3, wherein said engraved surface further includes engravings representing signature, and said engravings with said characters combination cooperatively forms said seal impression.

5. The stamping system according to claim 2, wherein said log file includes said file code and said image.

6. A method for affixing a seal impression on a paper document using a portable communication device, the portable communication device comprising a seal for generating said seal impression to be affixed on said paper document, the seal comprising a plurality of rotatable discs, each of the plurality of rotatable discs comprising engraved characters on an outer surface thereof, each of the plurality of rotatable discs being rotatable to a predetermined position, allowing a combination of the engraved characters of the plurality of rotatable discs to correspond to the file code generated by the server, said method comprising:

(a) sending a file code generation request to a server;

(b) generating randomly a unique file code in response to said file code generation request and sending said file code to said portable communication device;

(c) sending a control signal to a seal according to said file code;

(d) generating a seal impression that comprises the combination of the engraved characters of the plurality of rotatable discs that corresponding to said file code according to said control signal;

(e) sending a log file generation request to said server; and (f) generating a log file in response to said log file generation request.

7. The method according to claim 6 further comprising:

(a1) sending a user name and a user password to said server;

(a2) verifying of said user name and user password.

* * * * *